Figure 1:
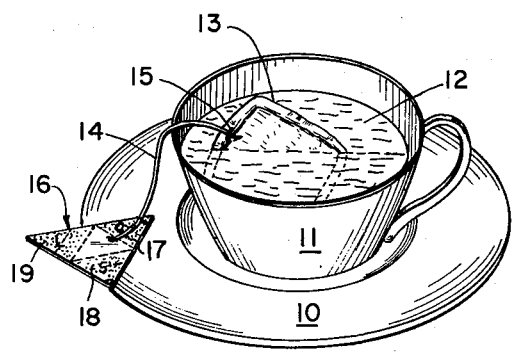

March 24, 1964 C. R. HOWERIN 3,126,284
INFUSION BAG WITH CONNECTED CARRIER IMPREGNATED
WITH DIFFERENT FLAVOR MODIFYING AGENTS
Filed Sept. 4, 1962

INVENTOR
CHARLES R. HOWERIN

BY *A. Yates Dowell*
ATTORNEY

United States Patent Office

3,126,284
Patented Mar. 24, 1964

3,126,284
INFUSION BAG WITH CONNECTED CARRIER IMPREGNATED WITH DIFFERENT FLAVOR MODIFYING AGENTS
Charles R. Howerin, Orlando, Fla.
Filed Sept. 4, 1962, Ser. No. 221,070
2 Claims. (Cl. 99—77.1)

This invention relates to the preparation of beverages such as tea, coffee and the like, to the ingredients utilized in the preparation thereof including the modifying agents, and to the manner in which the modifying agents are made available for use.

The invention relates particularly to the provision of a unit containing tea or other basic beverage element and the several modifying elements attached thereto and selectively usable for preparing the beverage, for example, a cup of tea with cream and sugar, or lemon and sugar, and in which unit the modifying agents are provided in a form in which they will not spill.

It has been customary to provide small bags or containers with individual servings of tea therein and larger containers for tea, coffee and the like in bulk and of various granular size or texture including what is commonly referred to as instant coffee and tea with which modifying ingredients are employed selectively according to the individual taste and where food and drink frequently are transported from the home on picnics and the like with cream, sugar, lemon or the like, any of which are apt to be forgotten or misplaced or spilled with accompanying untidiness.

It is an object of the invention to provide a beverage packet of simple, inexpensive, unitary, and compact character suitable for use in the preparation of a palatable beverage such as tea, coffee or the like, with the necessary modifying elements or ingredients by which the desired selection, flavor, creaminess, sweetness and the like readily can be obtained to satisfy individual tastes, as well as a beverage unit in which the cream, sugar, lemon, or other modifying ingredients, are impregnated in a suitable carrier or vehicle so that the possibility of spillage is substantially eliminated and the individual modifying agents may be selectively introduced into tea, coffee or other beverage in the desired degree by the amount of the introduction of the impregnated carrier, and the combination of the modifying ingredient with the tea, coffee, or other beverage, facilitated by the breakage or fragmentation providing a fresh area of contact with the beverage.

Another object of the invention is to provide the combination of a container for a quantity of tea, coffee, or other substance, and an intimately or remotely attached carrier or vehicle for modifying agents including cream, sugar or saccharine, citrus, either lemon or lime, and other agents such as cinnamon or other spices or substances to give the desired result to the consumer.

Figure 2:
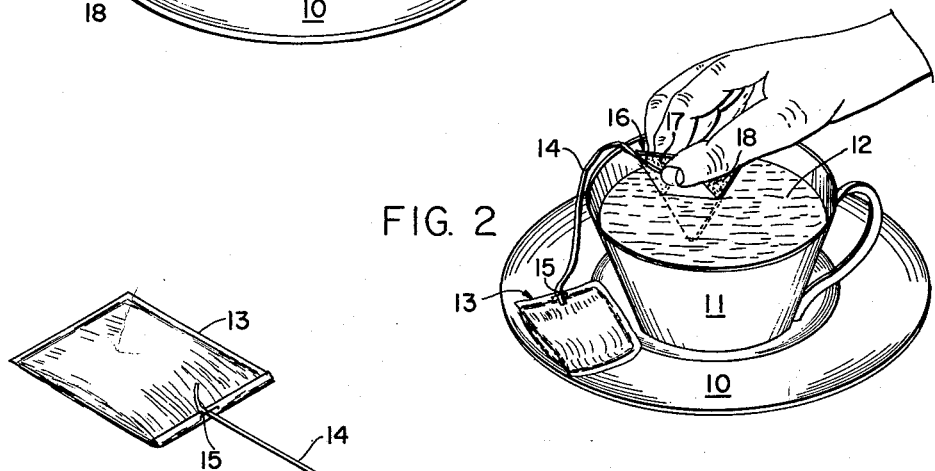
Figure 3:
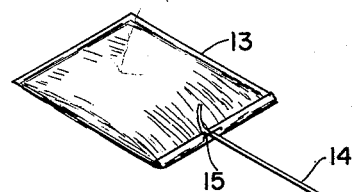

Other objects and advantages of the invention will be apparent from the following description taken in conjunction with the drawings wherein:

FIG. 1 is a perspective illustrating one application of the invention,

FIG. 2, a similar view illustrating the manner of applying the cream, sugar, lemon or other modifying agents to the liquid, FIG. 3, a perspective of the unit or packet constituting the present invention.

Figure 4:
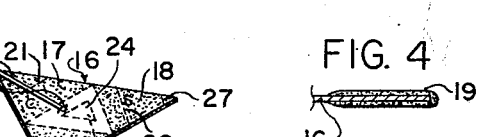
Figure 5:
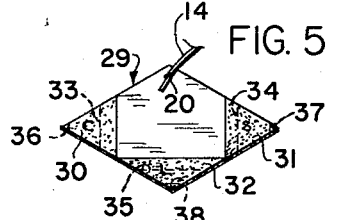

FIG. 4, a section on the line 4—4 of FIG. 3,

FIG. 5, a perspective of a carrier of modified shape, and

Figure 6:
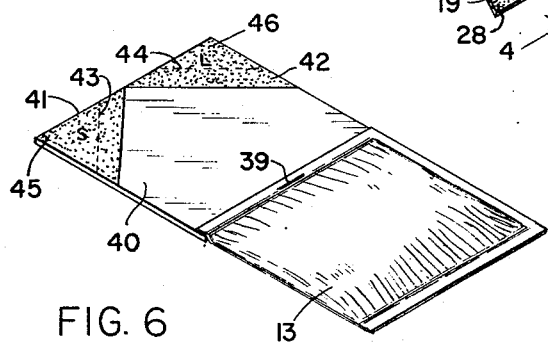

FIG. 6, a perspective of a packet or unit in which the container for the tea, coffee or the like and the carrier for the modifying agents are directly attached.

Briefly stated, the invention is a unit for addition to water for the preparation of a beverage which contains tea or other main substance or ingredient and modifying agents on the order of cream, sugar, lemon and the like, all of which provide the necessary elements for the preparation of a potable drink which can be prepared, made ready, and served, with a minimum of mental and physical attention and untidiness due to the fact that the ingredients are all physically connected in a unit or packet and in which the modifying agents are impregnated in the pores of a carrier avoiding possibility of spillage and enabling the selective use of each of the substances to obtain the desired taste.

With continued reference to the drawings FIGS. 1 and 2 disclose a saucer 10 on which is supported a cup 11, both of conventional construction and used for tea, coffee or other drink or palatable beverage 12.

The present invention is directed to the provision of a unit or packet of the necessary substances or ingredients all collectively joined and suitable for converting water into a beverage of the desired flavor from such single simple compact unit, the very nature of which makes it easier to obtain the desired characteristics in the beverage, as well as reduce the possibility of forgetting one or more of the ingredients, as well as spillage.

The present invention includes a bag 13 for coffee or other main ingredient which bag may be of any desired character as for example a sheet folded over and attached along the three overlying contiguous edges. To this bag or container 13 is adapted to be connected, by a string or cord 14 and a staple 15, a carrier 16 or other agent for ingredients which may be selectively utilized for providing the desired creaminess, sweetness and flavor characteristics of the beverage sought to be prepared.

The carrier 16 contains porous areas 17, 18 and 19 impregnated respectively with cream, sugar and flavoring such as lemon or lime and has a center triangle 24 of spice such as cinnamon and the like. The impregnated portions each being separate from the other and the carrier being of triangular shape as illustrated in FIG. 3, the carrier being attached to the string 14 by a staple 20. Three of the individually impregnated areas of the vehicle are at the corners and these portions are provided with weakened lines 21, 22 and 23 in order that when a smaller amount of the particular modifying agent is desired and unwanted portion may be discarded. Also the center triangular portion 24 is provided with weakened lines 25 which may be punched out to reduce the amount of cinnamon or other spice held in such area.

Further the points of the triangle may be provided with additional weakened lines 26, 27 and 28, in order that the tips of the card carrier may be detached to provide slightly less modifying ingredient as well as an additional area of contact therebetween and the liquid.

In FIG. 5 is disclosed a modified form of the device in which the carrier is in the form of a relatively square carriage or card 29 having impregnated areas 30, 31 and 32 for cream, sugar and lemon, and with weakened lines 33, 34 and 35 for the purpose described in regard to FIG. 3 and additional weakened lines 36, 37 and 38 to serve in the same manner, the carrier 29 being attached to the spring 14 by means of a staple 20.

In FIG. 6 is disclosed a modified form of construction in which a tea bag 13 is directly attached in any desired manner, as for example by a staple 39 to a carrier 40, such carrier having areas 41 and 42 of porous character impregnated with sugar, lemon or flavoring respectively and with weakened lines 43, 44 and 45 and 46 for the purposes described in the embodiment of FIG. 3.

It will be apparent from the foregoing that a unit is provided which can be added to water to prepare tea, coffee, or other beverages, easily and quickly with minimum attention, and without forgetting certain of the ingredients, or without spilling the same, since the unit includes all the elements joined in a single package. Also the carrier is impregnated at least in several areas with the secondary or modifying media and the structure is such that a consumer may use the ingredients selectively and totally or partially by the manner of introduction into the water, the carrier having weakened portions in the individual areas so that portions may be removed and smaller amounts of the ingredients may be used and if desired thereafter the entire carrier for the modifying ingredients may be immersed in the water.

It will be obvious to one skilled in the art that various changes may be made in the invention without departing from the spirit and scope thereof and therefore the invention is not limited by that which is illustrated in the drawings and described in the specification, but only as indicated in the claims.

What is claimed is:

1. An infusion unit for addition to water to prepare a beverage selected from the group consisting of coffee and tea, said unit comprising an infusion container with the product enclosed therein and a connected carrier for taste modifying agents, said connected carrier having porous areas individually impregnated with different taste modifying agents whereby a consumer may use such modifying agents selectively by the introduction thereof as desired into the formed beverage, said connected carrier having weakened portions in the areas individually impregnated with said modifying agents whereby when a small amount of any of said modifying ingredient is desired an appropriate amount of the connected carrier can be detached and the remainder of the connected carrier introduced into the formed beverage.

2. An infusion unit for addition to water to prepare a beverage selected from the group consisting of coffee and tea, said unit comprising an infusion container with the product enclosed therein and a carrier connected to said container and containing taste modifying agents, said carrier having individual areas each impregnated with a single different taste modifying substance whereby the consumer may selectively use the modifying substances of the carrier to obtain the desired characteristics as to taste.

References Cited in the file of this patent
UNITED STATES PATENTS

| | | |
|---|---|---|
| 1,931,765 | Leever | Oct. 24, 1933 |
| 2,362,459 | Barnett | Nov. 14, 1944 |
| 2,745,751 | Pichardo | May 15, 1956 |
| 2,791,324 | Knoop et al. | May 7, 1957 |
| 2,791,505 | Barnett | May 7, 1957 |